Jan. 20, 1942.　　　W. N. NASH　　　2,270,466
SHAFT COLLAR
Filed Dec. 14, 1938　　　3 Sheets-Sheet 1
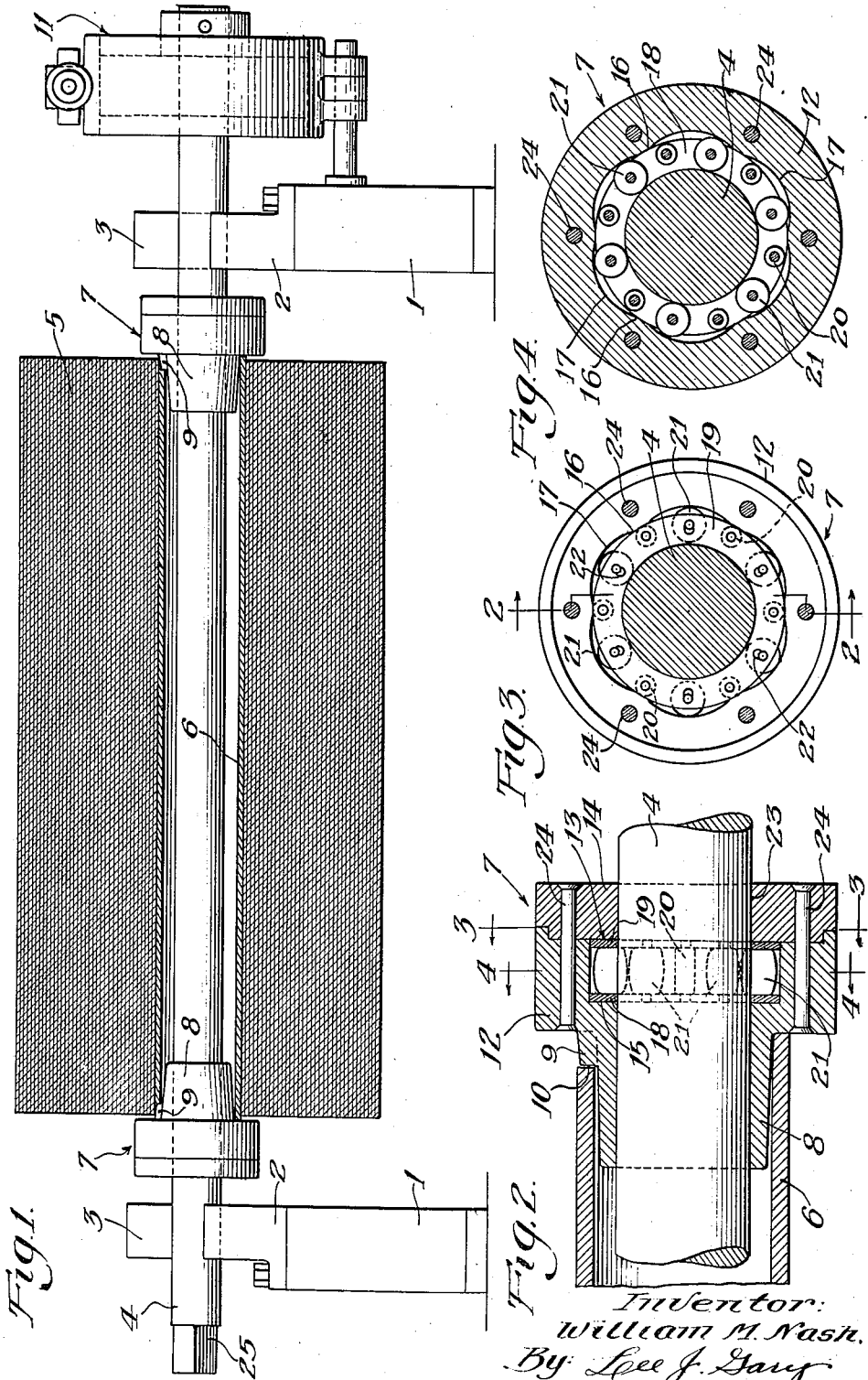
Inventor:
William N. Nash.
By Lee J. Gary
Attorney Jan. 20, 1942.   W. N. NASH   2,270,466
SHAFT COLLAR
Filed Dec. 14, 1938   3 Sheets-Sheet 2
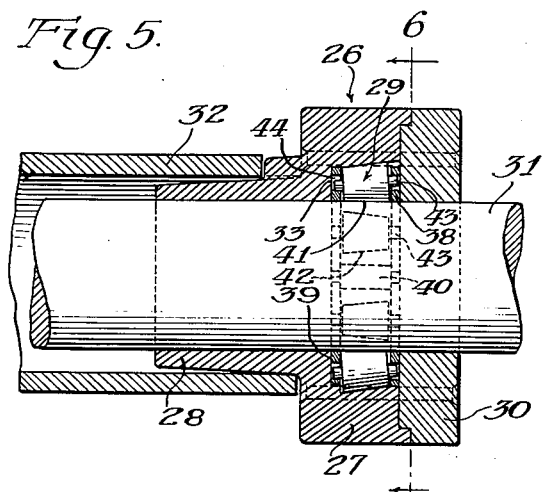
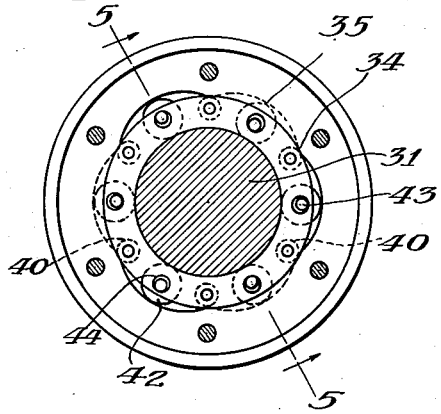
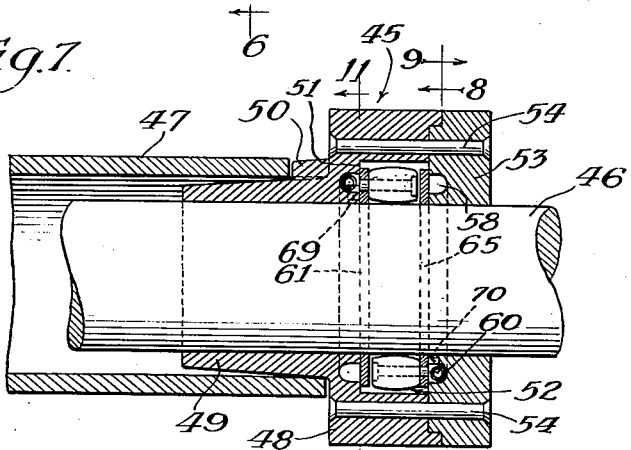
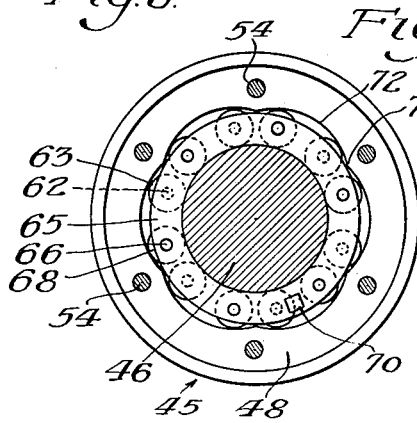
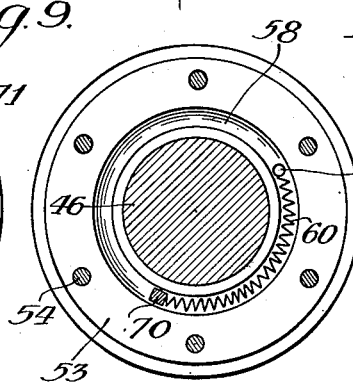
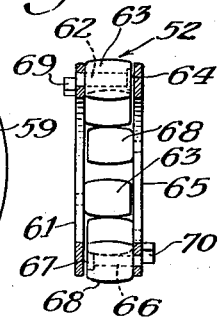
Inventor:
William M. Nash
By: Lee J. Gary
Attorney.

Jan. 20, 1942.  W. N. NASH  2,270,466
SHAFT COLLAR
Filed Dec. 14, 1938  3 Sheets-Sheet 3
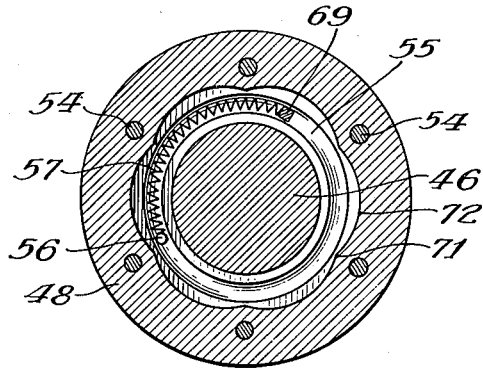
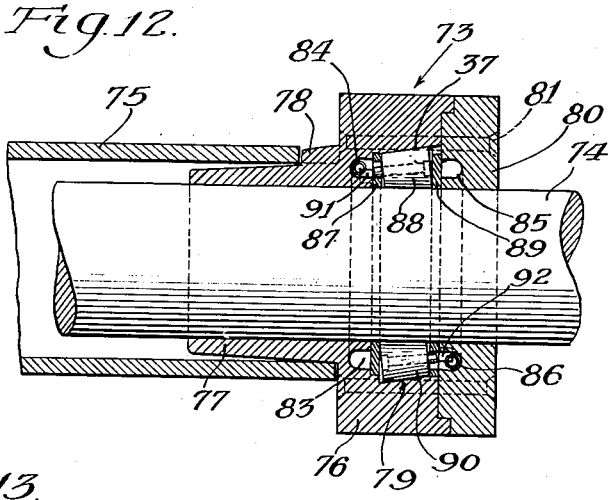
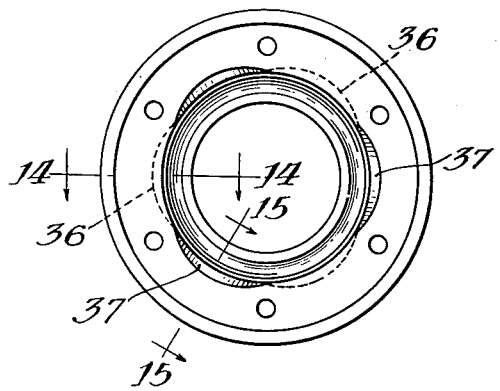
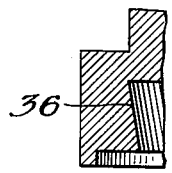
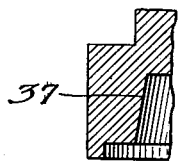
Inventor:
William M. Nash,
By: Lee J. Gary
Attorney.

Patented Jan. 20, 1942

2,270,466

UNITED STATES PATENT OFFICE 2,270,466

SHAFT COLLAR

William M. Nash, Menasha, Wis., assignor of one-fourth to Mary Nash Jones, one-fourth to Marie Duvall Nash, both of Neenah, Wis., and one-fourth to Roy A. Nash, Bronxville, N. Y.

Application December 14, 1938, Serial No. 245,611

9 Claims. (Cl. 287—52.09)

This invention relates to improvements in self locking collars, and refers specifically to shaft collars which are automatically locked in either direction upon the shaft without the use of keys, set screws or the like.

It is frequently required, in many operations, particularly in the winding or unwinding of continuous paper webs, to secure a collar upon a shaft and maintain said collar against rotary motion relative to the shaft. Collars for this purpose have heretofore been provided with keys and keyways or set screws whereby the necessary rigid relationship between the shaft and collar may be obtained.

In using keys, the shaft must be provided with keyways which, of course, increase the cost of the shaft. In addition, it involves considerable time and labor to properly set the collars upon the shaft. In using set screws, which has heretofore been the accepted practice, the shafts have been so gouged as to require the shaft to be frequently dressed. In addition, the heads of the set screws present rotating projections upon which clothing may be caught, endangering workmen. Further, it is necessary to use a wrench to tighten and loosen the set screws which involves time and labor.

In my invention a collar is provided which has none of the disadvantages heretofore described in conjunction with keyed collars or collars secured by set screws. It is merely necessary when disposing the collar in operative position upon the shaft to slide the collar over the end of the shaft to the desired position; when the "pull" comes on the collar, the same is automatically locked upon the shaft, the locking taking place automatically and over a relatively larger area of the shaft surface thereby eliminating local pressure and, hence, gouging of the shaft.

Briefly described, my invention comprises a plurality of rollers held in annular relationship, said set of rollers being adapted to embrace the shaft. The set of rollers are confined within a housing having a scalloped outer race against the indented portions of the scallops, the rollers wedge themselves when the housing is rotated relative to the shaft thereby locking the rollers between said scallops and the shaft. The housing is suitably connected with a mandrel or the like carried on the shaft whereby locking of the housing, locks said mandrel upon the shaft and the mandrel and shaft turn as a unit.

Other objects and advantages of my invention will be apparent from the accompanying drawings and following detailed description.

In the drawings,

Fig. 1 is a front elevational view of a shaft carrying a roll, shown in section, upon which my collars are mounted.

Fig. 2 is a longitudinal section taken on line 2—2 of Fig. 3, a fragmentary portion of the shaft being shown in elevation.

Fig. 3 is a transverse sectional view taken on the line 3—3 of Fig. 2.

Fig. 4 is a transverse sectional view taken on the line 4—4 of Fig. 2.

Fig. 5 is a view similar to Fig. 2 taken on the line 5—5 of Fig. 6, showing a modification of my invention.

Fig. 6 is a transverse sectional view taken on the line 6—6 of Fig. 5.

Fig. 7 is a longitudinal sectional view similar to Fig. 2 and Fig. 5 of a further modification of my invention.

Fig. 8 is a transverse sectional view taken on line 8—8 of Fig. 7.

Fig. 9 is a transverse sectional view taken on line 9—9 of Fig. 7.

Fig. 10 is a detail sectional view of the roller assembly used in the device shown in Fig. 7.

Fig. 11 is a transverse sectional view taken on the line 11—11 of Fig. 7.

Fig. 12 is a longitudinal sectional view of another modified form of my collar.

Fig. 13 is a fragmentary face view of the roller housing of the collar shown in Fig. 5.

Fig. 14 is a sectional view taken on line 14—14 of Fig. 13.

Fig. 15 is a sectional view taken on line 15—15 of Fig. 13.

My invention will be specifically described in conjunction with a winding or rewinding device used in the paper making industry. However, it is to be understood that my invention is not to be limited to this specific application since it is intended to be used wherever a like problem arises.

Referring in detail to the drawings 1, 1 indicates spaced standards or blocks upon which bearings 2, 2 are supported. The bearings are of the open type having a high side 3 at the rear thereof. A shaft 4 is journalled adjacent each end in the bearings 2 and is adapted to carry a roll of paper 5 which has previously been wound upon a tube or mandrel 6. Collars 7, comprising my invention, are mounted at each end of the tube 6, said collars having inwardly extending portions 8 which protrude into the ends of the tube and support the same, the inwardly extending portions being provided with keys 9 which engage in keyways or slots 10 provided at the ends of the tube.

The roll 5 comprises a continuous web of paper, and for purposes of illustration it will be assumed that the web is to be rewound upon another mandrel or tube (not shown). Of course, in so far as my invention is concerned, the collars can be used on the tube 6 when the shaft 4 is driven to wind the web upon the tube 6. However, with the assumption that the roll 5 is being unwound, it is essential in this operation that the shaft 4 be prevented from spinning. To accomplish this function a friction mechanism 11 is associated with the shaft. The mechanism 11 comprises no part of my invention and is well known in the art and will not be described in detail.

Each collar 7 is constructed essentially of three sections; a housing 12 which includes the extension 8; a roller assembly 13 and a closure plate 14. The housing 12 is provided with a recess 15 in which the roller assembly 13 is adapted to be positioned. Those walls of the recess 15 parallel to the axis of the shaft 4 are undulated or scalloped in a generally circular direction to provide a series of alternate crests 16 and troughs 17.

Each roller assembly 13 comprises two annular rings 18 and 19 held in spaced relationship by means of spacers 20. Rollers 21 are journalled at their respective ends in the openings 22 provided in the opposite rings 18 and 19, rollers 21 being alternately positioned with respect to the spacers 20.

In assembling the collar 7 the rollers 21 carried by the rings 18 and 19 are positioned in the recess 15, the rollers being inserted, as shown in Fig. 3, with respect to the undulated walls of the recess. The closure plate 14 having a central opening 23 is positioned over the mouth of the housing 12 and secured thereon by means of screws 24 or the like. The opening 23 is of approximately the same diameter as the shaft 4 and, hence, the roller assembly is prevented from moving laterally out of the recess 15.

The collars 7 may be positioned on shaft 4 after roll 5 and tube 6 are mounted thereon and the projecting ends 8 of the collars are inserted in the ends of the tube so that the keys 9 register with the keyways or slots 10. The web may then be drawn from the roll 5 and threaded upon the winding mandrel (not shown) or threaded through any desired mechanism such as a supercalender, printing press or the like.

As soon as the roll 5 is rotated relative to the shaft 4, or conversely, as soon as the shaft is rotated relative to the roll, as for instance by applying a wrench to the square end 25 of the shaft, the housing 12 or the shaft moves relative to the roller assembly until the rollers 21 bind between the crests 16 and shaft surface. Obviously, at this point the collar is securely locked upon the shaft with respect to relative rotary motion between the collar and shaft. In Fig. 4 the locked position is shown when the collar housing is moved counterclockwise with respect to the shaft. If the housing moves clockwise, the respective rollers bind against the crests 16 on the opposite sides of the troughs 17. To remove the collars it is merely necessary to relieve this binding tension by moving the shaft or roll 5 in the opposite direction until the rollers 21 occupy the position shown in Fig. 3.

Referring particularly to Figs. 5, 6, 13, 14 and 15, a modification of my invention is shown wherein 26 indicates my modified form of collar. The collar 26 comprises a housing 27 having a tapered extension 28; a roller assembly 29 and a closure plate 30. The collar 26 is adapted to be mounted on a shaft 31 and is further adapted to serve as a locking medium between said shaft and a tube or mandrel 32.

The housing 27 is similar in external appearance to housing 12 and like housing 12, is provided with a recess 33. The circumferential contour of the defining walls of the recess is undulated or scalloped to form a plurality of adjacent crests 34 and troughs 35. In addition to the lateral defining walls of the recess 33 being undulated, the walls of said troughs are tapered in a direction parallel to the axis of the shaft 31. The arrangement is such that the walls of adjacent troughs are tapered in opposite directions, as shown best at 36 and 37 in Figs. 14 and 15.

The roller assembly 29 comprises a pair of annular rings 38 and 39 which are attached to, and maintained in separate relationship by spacers 40. Interspersed between the spacers around the circumference of the rings are rollers 41 and 42 which are carried by shafts 43 which, in turn, are journalled in apertures 44 provided in the rings 38 and 39 whereby the rollers are freely rotatable. The apertures 44 are larger than the shafts 43 whereby said shafts have a degree of lateral freedom of movement, the purpose of which being hereinafter described.

Both rollers 41 and 42 are tapered, that is, are frustro-conical. However, throughout the circumference of the rings the rollers are alternated, that is, a roller 41 is disposed between two rollers 42, and each roller 42 is disposed between two rollers 41, etc. The roller assembly embraces the shaft 31 and is adapted to be positioned within the recess 33, the arrangement being such that the taper of the rollers conforms, more or less, with the longitudinal taper of the walls of the recess.

In practice, the degree of taper of the rollers 41 and 42 is relatively small, being in the neighborhood of about one degree. However, for purposes of clarity of description the taper is exaggerated in the drawings. It is intended that the rollers 41 and 42 make osculating line contact with the shaft surface. Hence, by the provision of the enlarged bearing apertures 44, the axes of the rollers may be canted. Likewise, the taper of the walls of the recess 33 is approximately twice the degree of taper of the rolls so that the rollers may assume the required canted position.

The closure 30 may be positioned on the mouth of the housing and secured thereto by means of screws or the like whereby the roller assembly 29 is confined in the recess 33. It is to be understood that the collar need not be assembled on the shaft since it is possible to assemble the collar as a stock unit and mount the same on, and remove the same as a unit from the shaft.

In operation, rotary movement of the housing relative to the shaft or vice versa results in the locking of the rollers adjacent the crests 34. However, when said rollers are thus locked, longitudinal movement of the collar in either direction upon the shaft is also prevented since one-half of the tapered rollers wedge against the respective tapered walls of the recess 33 when a force is applied in a predetermined longitudinal direction. However, when the collar is backed up the rolls move into the troughs 33 and the collar may be conveniently slid longitudinally of the shaft.

Referring particularly to Figs. 7, 8, 9, 10 and 11, another modification of my invention is illustrated wherein 45 indicates a collar mounted upon a shaft 46, said collar being adapted to support and lock a tube or mandrel 47 upon the shaft 46. The collar 45 comprises a housing 48 having an extension 49, a key 50 being formed integral with the extension 49. The housing 48 is provided with a recess 51 within which a roller assembly 52 is adapted to be positioned. A closure 53 is adapted to be secured by means of screws or the like 54 over the mouth of the housing 48, whereby the roller assembly 52 is confined within the recess 51.

The inner face of the recess 51 is provided with an annular groove 55. A pin 56 is rigidly secured in the groove 55 and serves as an anchoring medium for coil spring 57 which is adapted to be disposed within the groove 55. Similarly an annular groove 58 is provided in the inner face of the closure 53 and a pin 59 is rigidly secured in the groove 58, said pin serving as an anchoring medium for coil spring 60 which is also disposed in the groove 58. Both grooves 55 and 58 open into the recess 51 and are disposed oppositely with respect to each other.

The roller assembly 52 comprises an annular ring 61 upon which are mounted a plurality of pins 62. Rollers 63 are mounted upon pins 62 and are retained thereon by the flanged head 64 of the pin 62. A second annular ring 65 carries a plurality of pins 66 having flanges 67 at their heads whereby rollers 68 are rotatably positioned upon the pin 66. In assembling the roller assembly 52, the plates 61 and 65 are so positioned that the rollers 63 and 68 are disposed in interdigitating relationship, that is, a roller 63 is positioned between two adjacent rollers 68, and similarly a roller 68 is positioned between two adjacent rollers 63. The roller assembly 52 as has been hereinbefore described is adapted to be positioned within the recess 51 and is adapted to embrace shaft 46. A lug 69 extends from the face of the ring 61 and is adapted to project into the groove 55, said lug abutting against the opposite end of the coil spring 57. Similarly a lug 70 is mounted upon the face of ring 65 and is adapted to project into the groove 58 and abut against the opposite end of the coil spring 60.

The lateral walls defining the recess 51 are undulated or scalloped to provide a plurality of adjacent crests 71 and troughs 72. The roller assembly 52 is positioned within the recess so that a pair of rollers is disposed within each trough 72, the pair of rollers comprising one roller 63 and a roller 68. Under the influence of spring 57 all of the rollers 63 are moved into a position adjacent one side of each of the crests 71. Under the influence of the coil spring 60 each of the rollers 69 is moved into contact with the opposite side portion of each of the crests 71. In other words, the springs 57 and 60 are normally under compression and tend to move the rollers 63 and 68 in opposite directions within the troughs 70 so as to dispose said rollers on opposite sides of each crest 70. It can readily be seen that by this arrangement only a relatively small amount of play is permitted for the collar 45 upon the shaft 46 since the rollers of the roller assembly 52 are normally in a mildly wedged condition. Hence, substantially immediately upon relative movement of the housing 48 with respect to the shaft 46 or vice versa, the collar 45 turns as a unit with the shaft 46.

Referring particularly to Fig. 12, a further modification of my invention is shown wherein 73 indicates a modified form of my shaft collar. The collar 73 is adapted to be mounted on a shaft 74 and is further adapted to engage with a tube or mandrel 75. The collar 73 comprises a housing 76 having an extension 77 which carries an integral key 78 which is adapted to engage in a keyway provided in the tube or mandrel 75. The collar also comprises a roller assembly 79 and a closure plate 80 which is mounted upon the housing 76 by means of screws or the like 81.

The housing 76 is similar in construction to the housing 27, having a recess 82, the lateral walls of which are both scalloped or undulated in a generally circumferential direction, and are oppositely tapered in a longitudinal direction, that is, adjacent troughs are tapered longitudinally in opposite directions. The inner defining wall of the recess 82 is provided with an annular groove 83 in which a coil spring 84 is positioned, the coil spring being similar to and anchored in a similar manner as has hereinbefore been described with respect to the coil spring 57. The inner face of the closure plate 80 is also provided with an annular groove 85 in which a coil spring 86 is positioned, said coil spring being anchored in a manner similar to that hereinbefore described with respect to coil spring 60.

The roller assembly 79 comprises an annular plate 87 upon which a plurality of rollers 88 are mounted. The assembly also comprises an annular ring 89 which carries a plurality of rollers 90. The rollers 88 and 90 are disposed in interdigitating relationship with respect to each other and a pair of rollers is positioned in each of the troughs of the recess 82, the arranging being similar to that described in conjunction with the rollers 52. Each pair of rollers positioned within a predetermined trough of the recess 82 comprises one roller carried by the plate 87 and another roller carried by the plate 89. However, the rollers 89 and 90 are tapered rollers, half of the rollers carried by the ring 87 being tapered in one direction and half being tapered in the opposite direction. Similarly half of the rollers carried by the ring 89 are tapered in the opposite direction. Each pair of rollers, however, which are positioned in a predetermined trough are tapered in the same direction and the rollers in adjacent troughs are tapered in opposite directions.

Under the influence of springs 84 and 86 which bear against lugs 91 and 92 respectively, one roller in each trough is moved toward the crest adjacent said trough. In this manner a pair of rollers will be disposed on each side of each crest, said rollers being tapered or pitched in opposite directions.

The arrangement is such that relative rotary movement between the collar 73 and shaft 74 is substantially prevented since, under the influence of the springs 84 and 86 the rollers bear with a mild degree of force upon the crests of the recess walls. However, the force exerted by the springs 84 and 86 is not sufficient of itself to lock the collar 73 against longitudinal movement upon the shaft 74. Hence, the collar 73 may be mounted upon and removed from the shaft 74 at will. However, when a load is placed upon the collar 73 and said collar tends to move in a rotary direction relative to the shaft 74 or vice versa, sufficient wedging force is created between the crests and the rollers to not only prevent relative rotary motion of the collar and shaft but also to prevent relative longitudinal motion of the collar and shaft.

Similar to the form of my invention described in conjunction with Figs. 5, 6, 13, 14 and 15, the rollers 88 and 90 have a very slight taper in the neighborhood of 1° and are adapted to be disposed in line contact with the surface of the shaft 74. The longitudinal taper of the lateral walls of the recess 82 is substantially twice the taper of the rollers so as to permit the surface of the rollers 88 and 90 to lie parallel with the surface of the shaft 74. The apertures in which the pins of rollers 88 and 90 are positioned are larger than the diameter of the pins themselves and, consequently, permit the canting of the axes of said rollers to assume the position shown in Fig. 12.

I claim as my invention:

1. An automatically locking shaft collar which comprises a housing adapted to be slid into position onto and to removably embrace a cylindrical shaft, said housing being provided with a substantially annular recess which opens toward the cylindrical surface of said shaft, a wall defining said recess being radially spaced from said shaft and being undulated to form a plurality of crests which extend toward said shaft and troughs which extend away from said shaft, the defining wall of said recess adjacent said troughs being tapered in a direction longitudinal of said shaft, a plurality of tapered rollers positioned in said recess between said undulated wall and the cylindrical surface of said shaft, and means for confining a tapered roller in each trough, the taper of said rollers conforming substantially with the taper of said trough walls, the mean diameter of said tapered rollers being greater than the mean distance between the crests and said shaft whereby relative rotary movement of said housing with respect to the shaft wedges the rollers between the shaft and crests to prevent relative rotary movement of the housing and shaft, and relative axial movement of said housing and shaft in the direction of convergence of said tapered rollers locks said rollers between the housing and shaft, and means circumscribing said shaft connecting the axes of said rollers together to cause said rollers to move into locking position simultaneously.

2. An automatically locking shaft collar which comprises a housing adapted to removably embrace a cylindrical shaft, said housing being provided with a substantially annular recess which opens toward the cylindrical surface of said shaft, a wall defining said recess being spaced from said shaft and being undulated to form a plurality of crests which extend toward said shaft and troughs which extend away from said shaft, the defining wall of said recess adjacent said troughs being tapered in a direction longitudinal of said shaft, the taper of adjacent troughs being pitched in opposite directions, a plurality of tapered rollers positioned in said recess between the undulated wall and the cylindrical surface of said shaft, and means for confining a tapered roller in each trough, the taper of the rollers in the respective troughs substantially conforming with the taper of the walls of said trough, the mean diameter of said tapered rollers being greater than the mean distance between the crests and said shaft whereby relative rotary movement of said housing with respect to the shaft wedges the rollers between the cylindrical surface of the shaft and the crests to prevent relative movement of the housing and shaft, and means circumscribing said shaft connecting the axes of said rollers together to cause said rollers to become wedged simultaneously.

3. An automatically locking shaft collar which comprises a housing adapted to be slid into position onto and to removably embrace a cylindrical shaft, said housing being provided with a substantially annular recess which opens toward said shaft, a wall defining said recess being radially spaced from said shaft and being undulated to form a plurality of alternate crests which extend toward said shaft and troughs which extend away from said shaft, a plurality of rolling elements positioned in said recess between the undulated wall and the cylindrical surface of said shaft, means for confining a rolling element in each trough including a pair of spaced rings, said rolling elements having diameters larger than the distances between the crests and the shaft whereby relative rotary motion of said housing in either direction with respect to said shaft wedges said rolling elements between said crests and the cylindrical surface of said shaft and locks the housing upon the shaft, and resilient means between said housing and said rings for maintaining a rolling element in each trough in engagement with a crest adjacent the respective trough.

4. An automatically locking shaft collar which comprises a housing adapted to be slid into position onto and to removably embrace a cylindrical shaft, said housing being provided with a substantially annular recess which opens toward said shaft, a wall defining said recess being radially spaced from said shaft and being undulated to form a plurality of crests which extend toward said shaft and troughs which extend away from said shaft, the defining wall of said recess adjacent said troughs being tapered in a direction longitudinal of said shaft, a plurality of tapered rollers positioned in said recess between the undulated wall and the cylindrical surface of the shaft, and means for confining a tapered roller in each trough including a pair of spaced rings, the taper of said rollers conforming substantially with the taper of said trough walls, the mean diameter of said tapered rollers being greater than the mean distance between the crests and said shaft whereby relative rotary movement of said housing with respect to the shaft wedges the rollers between the cylindrical surface of the shaft and the crests to prevent relative movement of the housing and shaft, and resilient means between said housing and said rings for maintaining a tapered roller in each trough in close proximity to a crest adjacent the respective trough.

5. An automatically locking shaft collar which comprises a housing adapted to removably embrace a shaft, said housing being provided with a substantially annular recess which opens toward said shaft, a wall defining said recess being spaced from said shaft and being undulated to form a plurality of crests which extend toward said shaft and troughs which extend away from said shaft, the defining wall of said recess adjacent said troughs being tapered in a direction longitudinal of said shaft, the taper of adjacent troughs being pitched in opposite directions, a plurality of tapered rollers positioned in said recess, and means for confining a tapered roller in each trough, the taper of the rollers in the respective troughs substantially conforming with the taper of the walls of said trough, the mean diameter of said tapered rollers being greater than the mean distance between the crests and said shaft whereby relative rotary movement of said housing with respect to the shaft wedges the rollers between the shaft and crests to prevent relative movement of the housing and shaft, and means for maintaining a tapered roller in each trough in close proximity to a crest adjacent the respective trough.

6. An automatically locking shaft collar which comprises a housing adapted to removably embrace a shaft, said housing being provided with a substantially annular recess which opens toward said shaft, a wall defining said recess being spaced from said shaft and being undulated to form a plurality of alternate crests which extend toward said shaft and troughs which extend away from said shaft, a roller assembly positioned in said recess, said roller assembly comprising a plurality of rolling elements and a pair of spaced rings upon which the said rolling elements are rotatively positioned, means for confining said roller assembly in said recess with a rolling element in each trough, said rolling elements having diameters larger than the distances between the crests and the shaft whereby relative rotary motion in either direction of said housing with respect to said shaft wedges said rolling elements between said crests and shaft and locks the housing upon the shaft, and means for urging said spaced rings in a rotary direction to maintain a rolling element in each trough in engagement with a crest adjacent the respective trough.

7. An automatically locking shaft collar which comprises a housing adapted to removably embrace a shaft, said housing being provided with a substantially annular recess which opens toward said shaft, a wall defining said recess being spaced from said shaft and being undulated to form a plurality of alternate crests which extend toward said shaft and troughs which extend away from said shaft, a roller assembly positioned in said recess, said roller assembly comprising a pair of spaced rings, a plurality of rollers rotatively positioned on each ring, said rollers on the spaced rings being adapted to be disposed in interdigitating relationship, means for confining a pair of rollers in each trough, a roller of each pair being mounted upon one ring and a roller of each pair being mounted on the other ring, said rollers having diameters greater than the distances between the crests and the shaft whereby relative rotary movement of said housing with respect to said shaft wedges the rollers secured to one ring between the crests and the shaft, and means for normally positioning the rollers in each trough adjacent both crests adjacent said trough.

8. An automatically locking shaft collar comprising: a housing adapted to be slid into position upon a cylindrical shaft, said housing having a substantially annular recess surrounding said shaft, one wall of said recess being radially spaced from said shaft and being undulated to form a plurality of alternating troughs and crests; a roller assembly positioned in said recess, said roller assembly including a plurality of rollers receivable in said troughs, and a pair of rings rotatably supporting said rollers; and resilient means between said housing and one of said rings normally tending to rotate said ring relative to said housing.

9. An automatically locking shaft collar adapted to be slid into position upon a cylindrical shaft comprising: a housing having a substantially annular recess surrounding said shaft, one wall of said recess being radially spaced from said shaft and being undulated to form a plurality of alternate crests and troughs; a roller assembly mounted in said recess, said roller assembly comprising two spaced rings and a plurality of series of rollers between said rings with at least one roller in each of said troughs, one of said series of rollers being mounted upon one of the rings and the other of said series of rollers being mounted upon the other of said rings, said series of rollers being arranged so that the rollers on the two rings are disposed in interdigitating relationship; and resilient means between said rings and housing normally tending to rotate said rings in opposite directions relative to said housing.

WILLIAM M. NASH.